(No Model.) 6 Sheets—Sheet 1.

F. R. SCOFIELD.
BOLT THREADING MACHINE.

No. 417,344. Patented Dec. 17, 1889.

WITNESSES.
W. R. Edelen,
Geo. W. King

Frank R. Scofield INVENTOR.
By
Leggett & Leggett,
ATTORNEY.

(No Model.)  6 Sheets—Sheet 3.

F. R. SCOFIELD.
BOLT THREADING MACHINE.

No. 417,344. Patented Dec. 17, 1889.

WITNESSES:
W. R. Edelen
Geo. W. King

INVENTOR.
Frank R Scofield
By
Leggett & Leggett
ATTORNEY.

(No Model.) 6 Sheets—Sheet 6.

F. R. SCOFIELD.
BOLT THREADING MACHINE.

No. 417,344. Patented Dec. 17, 1889.

WITNESSES.
W. R. Edelen.
Geo. W. King.

INVENTOR.
Frank R. Scofield
By
Leggett & Leggett.
ATTORNEY.

N. PETERS, Photo-Lithographer, Washington, D. C.

UNITED STATES PATENT OFFICE.

FRANK R. SCOFIELD, OF CLEVELAND, OHIO.

BOLT-THREADING MACHINE.

SPECIFICATION forming part of Letters Patent No. 417,344, dated December 17, 1889.

Application filed February 4, 1889. Serial No. 298,592. (No model.)

*To all whom it may concern:*

Be it known that I, FRANK R. SCOFIELD, of Cleveland, in the county of Cuyahoga and State of Ohio, have invented certain new and useful Improvements in Feed Mechanism for Bolt-Threading Machines; and I do hereby declare the following to be a full, clear, and exact description of the invention, such as will enable others skilled in the art to which it pertains to make and use the same.

My invention relates to improvements in feed mechanism for bolt-threading machines in which the bolts are automatically fed to and discharged from the machine, the object being to lessen the manual labor necessary in operating the machine.

My invention also relates to the details of construction hereinafter described, and pointed out in the claims.

In the accompanying drawings.

Heretofore with bolt-threading machines the bolts have usually been fed to and removed from the machine by hand. To a bolt-threading machine substantially of ordinary construction I have added a revolving hopper, into which the bolts are placed in quantity, with tilting fingers, curved ways, and other co-operating devices, by means of which the blank bolts are picked out of the hopper and delivered alongside of and in near proximity to the bolt-holders and in position within the reach of the grippers of the feed mechanism hereinafter described, the revolving hopper and co-operating devices being substantially the same as heretofore used on machines for cutting wood-screws. Only a brief description of these well-known devices is given; but enough, it is believed, to show clearly the general working of the machine.

A represents a suitable bed-plate, somewhat resembling the shears of an ordinary metal-working lathe, the bed-plate being mounted on legs and the bed-plate and its attachments supporting the entire mechanism connected with the machine.

Figure 5:
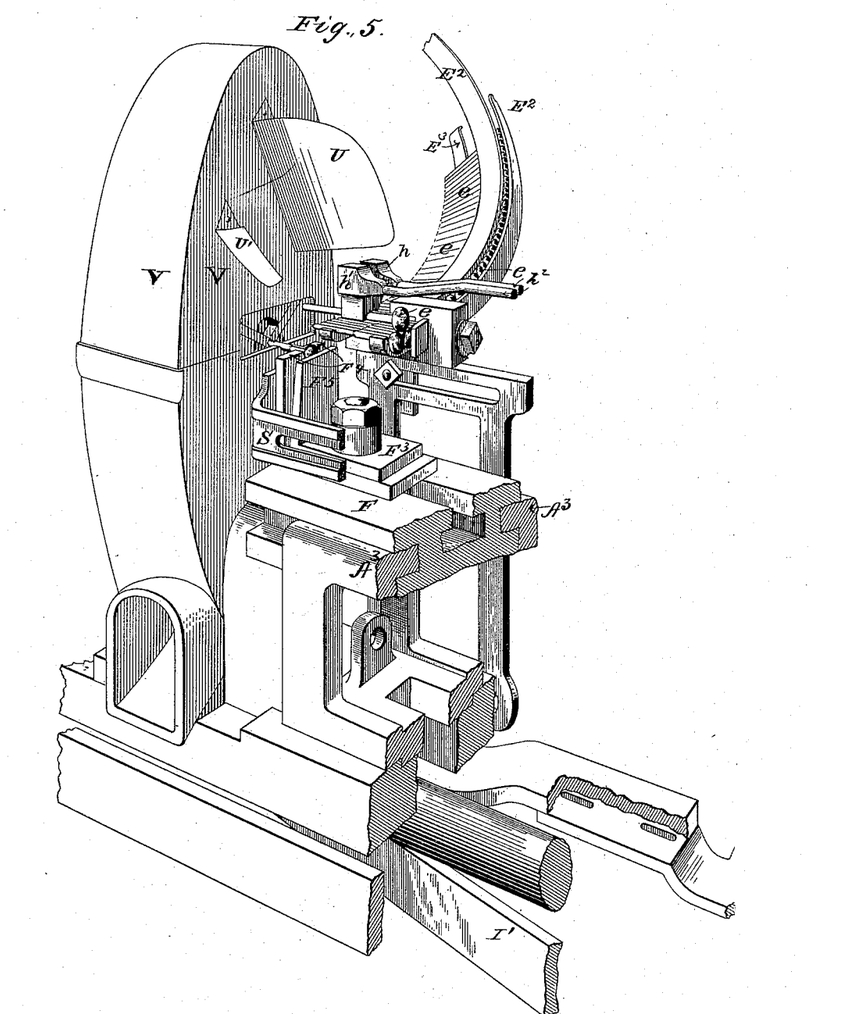
Fig. 5 is an enlarged perspective taken next rearward of the view shown in Fig. 4.

B is the spindle, on which is mounted the die-head B', the spindle being journaled in boxes A', connected with the bed-plate, the spindle having attached thereto the driving-pulley $B^2$. The die-head is of ordinary construction, having sectional screw-threading dies, the different die-sections being attached, respectively, to the forward ends of tilting levers $b$, these levers being pivoted at $b'$. A conical-ended sleeve $b^2$, usually known as the "cone," is mounted on and reciprocates endwise of spindle B. By moving this cone forward the rear arms of the levers are distended, thereby closing the dies in position for screw-threading the bolts. When the cone is reversed or backed out, the levers rearward are collapsed by the action of spring $b^3$, thereby opening the die and releasing the bolts. Sleeve $b^2$ is actuated by the movement of arm G, this arm being forked and the sleeve having a circumferential groove for engaging the prongs of the arm. In reversing sleeve $b^2$, when the ends of the levers engage the conical section thereof for purposes hereinafter mentioned, the tension given to the spring and the pitch of the cone are such that the cone is backed out the remaining portion of its rearward throw with considerable force, of course carrying arm G and attachments along with it. Spindle B is intergeared, as shown, with lateral shafts C, this shaft being journaled in boxes $A^2$, connected by means of suitable arms with the bed-plate. Shaft C has mounted thereon gears C' and $C^2$, the former engaging a train of gears $C^3$, that operate hopper E and the co-operating devices of the hopper. Gear $C^2$ engages gear $c$, this gear being journaled on cam-shaft D. The hopper E, in which the blank bolts are placed, revolves slowly, and tilting fingers E', in their depending position, (shown in Fig. 1,) extend down into the hopper and engage the bolts, more or less of which enter between these fingers, and such of the bolts as enter with their heads above the fingers are retained between the fingers, and when the fingers are tilted upward by the action of a cam, (not shown,) such bolts slide by gravity down the fingers and enter between ways $E^2$ $E^2$. These ways have such inclination that the bolts descend therein by gravity, and the ways are curved and twisted a quarter-turn, so that the bolts are delivered, as shown at $e$, in approximately a horizontal position and approximately parallel with the machine. (See Figs. 1, 5, and 10.) As the bolts in sliding down the ways approximate a horizontal position, they engage a curved rest $E^3$, corresponding with the ways, this rest supporting the free end of the bolts and preventing their cramping in the ways.

F is a carriage reciprocated on ways $A^3$, the latter being connected with the bed-plate. (See Fig. 4.) This carriage has a horizontal recess F' with undercut walls, as shown, for adjustably attaching bolt-holder $F^3$ and other members hereinafter described. The carriage has a depending arm $F^2$, that near its lower extreme connects with the rounded section of bar $f$, by the action of which bar the carriage is reciprocated on the ways. Bar $f$ has a shoulder engaging the rear face of arm $F^2$, and between the forward face of the arm and the securing-nut of the bar is located a short stiff spring $f'$, for purposes hereinafter mentioned. Spring $f^2$ connects at one end with bar $f$ and at the other end with a stationary member of the machine, this spring acting rearward on bar $f$. Arm $F^2$ midway thereof embraces rod G' loosely. This rod has considerable end play, that is regulated by adjustable collars $G^2$ and $G^3$. Rod G' is curved, as shown, to avoid contact with other members, and has arm G attached thereto for opening and closing the dies. As the carriage moves forward to its position for receiving a bolt arm $F^2$ engages the forward collar $G^2$, whereby rod G' is moved forward to close the die. Near the end of the rearward movement of the carriage and near the completion of the bolt-cutting, arm $F^2$ engages rear collar $G^3$, whereby arm G is moved so far rearward as to back sleeve $b^2$ until lever $b$ engages the conical section of the sleeve, after which the rod, by means aforesaid, is further moved rearward with sufficient force to operate the catch of the clutch mechanism hereinafter described.

The bolt-holder $F^3$ shown is of ordinary construction, having jaws $F^4$ for embracing the square shank of the bolt and having a plate $F^5$ abutting against the head of the bolt to hold the latter endwise while it is being delivered and forced into the die. The bolt-holder is adjusted lengthwise the carriage, according to the length of the bolt, and when other varieties of bolts than those having square shanks are being cut other varieties of bolt-holders shaped accordingly are substituted.

Figures 2, 10, 15:
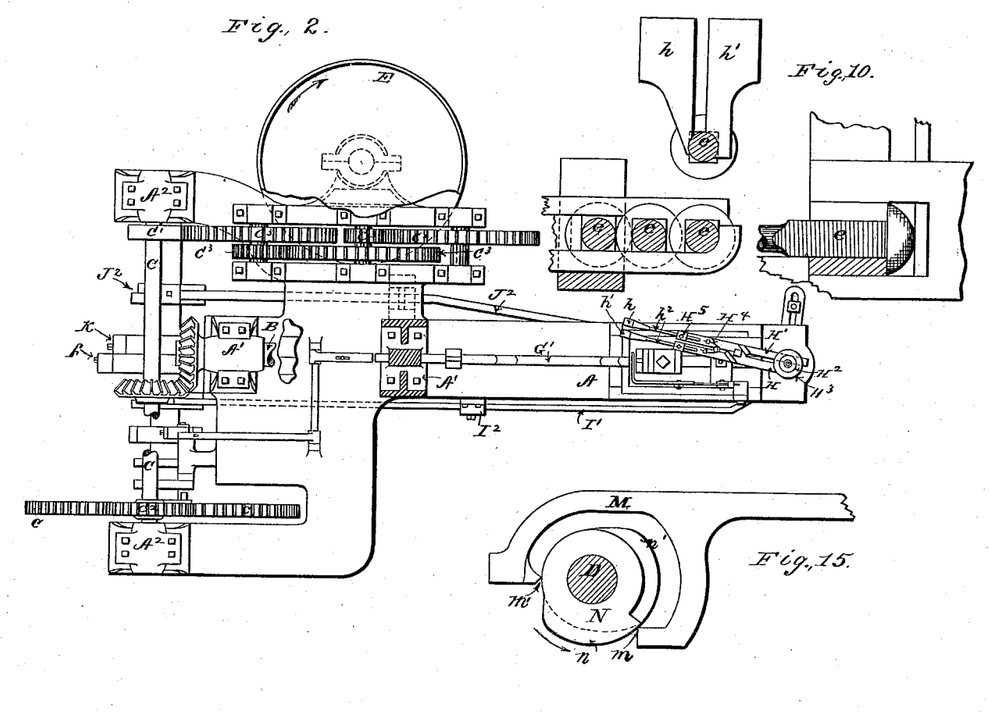
Fig. 2 is a plan partly in section.
Fig. 10 shows a rear elevation of grippers and side elevation of bolt-holder, the two views being taken at right angles to each other.
Figures 3, 6, 11, 12:
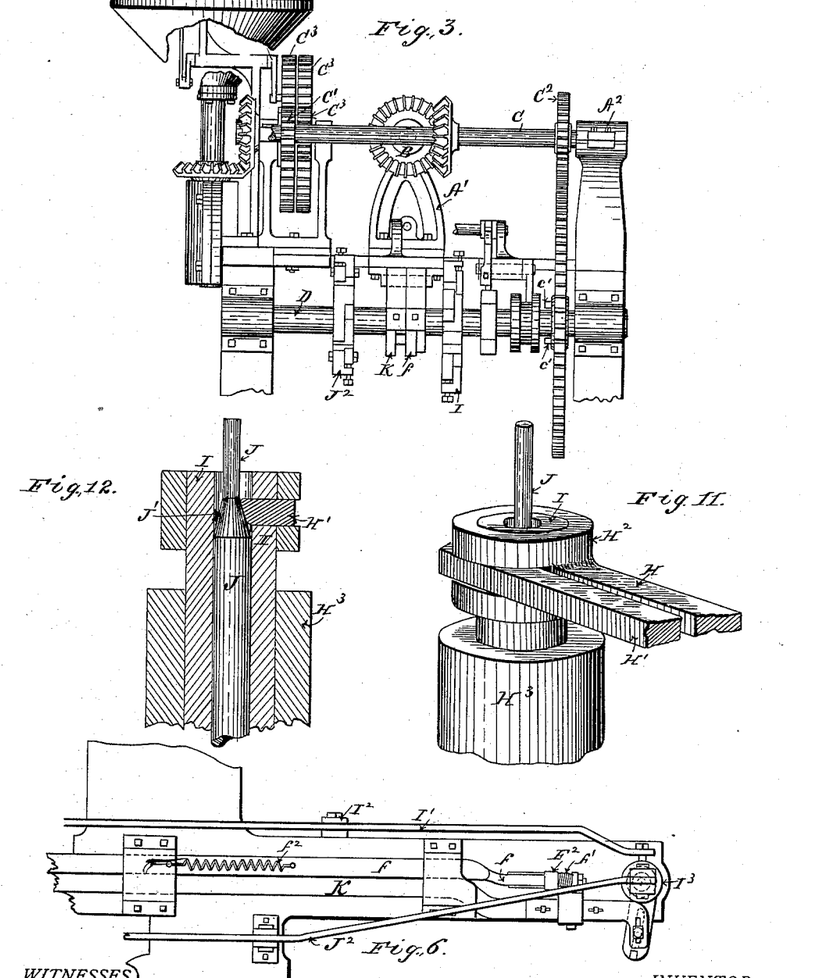
Fig. 3 is a rear end elevation.
Fig. 6 is a bottom plan of the lower connection.
Figs. 11 and 12 are enlarged details of mechanism for operating the grippers, the former being in perspective, and the latter is a sectional view.

The automatic feed mechanism (whereby the successive blank bolts are picked from their position, resting at the lower end of ways $E^2$, and are delivered from thence to the bolt-holder $F^3$, and from thence, after the screw-cutting, are discharged from the machine) is as follows:

The grippers for handling the bolts are essentially tongs, the arms thereof crossing each other and being pivoted together, but having depending jaws for grasping the bolt. One arm H of the grippers terminates in a broad collar $H^2$, the latter rigidly embracing the upper section of vertical sleeve I, the sleeve and collar being slotted, as shown in Figs. 11 and 12, to receive the other arm H' of the grippers, whereby arm H' is steadied and made to operate with precision. The jaw $h$ of arm H is wedge-shaped, being broad and thin at the end and adapted to enter between the bolts, the latter midway thereof, where they are grasped by the grippers, being slightly separated the one from the other by reason of the bolt-heads. The opposing jaw $h'$ of arm H' is curved on the face thereof, where it engages the bolt, so as to fit the latter and prevent the bolts from tilting while being carried by the grippers. (See Fig. 10.) Sleeve I operates in the bore of stationary standard $H^3$, the sleeve having a reciprocating movement endwise for raising and lowering the grippers and having a limited oscillating movement on its axis for swinging the grippers laterally. The grippers are closed by the action of spring $H^4$, connected with the two gripper-arms H H', and the grippers are opened by the action of spindle J, the latter having a reciprocating movement endwise and operating in the bore of sleeve I aforesaid. This spindle has a conical section J', and with the upward movement of the spindle this conical portion thereof engages the opposing inner face of arm H', forcing this arm outward against the action of spring $H^4$, and thereby opening the gripper-jaws. It is evident that for each and every bolt conveyed by the grippers and deposited by them in the bolt-holder that the grippers must make the following movements, to wit: First, the grippers must swing toward and from the bolt-holder; second, the grippers must move up and down twice, one down-and-up movement being required in picking up the bolt, and another down-and-up movement being required in depositing the bolt in the bolt-holder and returning to the place of beginning, thus requiring two reciprocations of sleeve I; third, the grippers must open to receive the bolt and must open again in discharging the bolt, thus necessitating two reciprocations of spindle J. In point of fact, as will hereinafter appear, these movements of the grippers are indirectly controlled by the reciprocations of the carriage F and its attachments, and these movements occur whether the grippers are carrying bolts or are operating idly.

For reciprocating sleeve I in raising and lowering the grippers tilting lever I' is provided, the latter being fulcrumed at I². The connecting device between the lever and sleeve consists of a collar I³, journaled on the sleeve, but held by suitable collars or shoulders from moving endwise on the sleeve. Collar I³ has a wrist I⁴, that operates in a hole in lever I', the hole being elongated lengthwise of the lever to accommodate the sweep of the lever in describing a limited arc. For reciprocating spindle J in opening and closing the grippers tilting lever J² is provided, the lever and spindle having a pivotal connection, the hole in the lever that receives the pivotal pin being slightly elongated lengthwise of the lever, so that the spindle is not cramped in tilting the lever.

Figures 1, 16, 17:
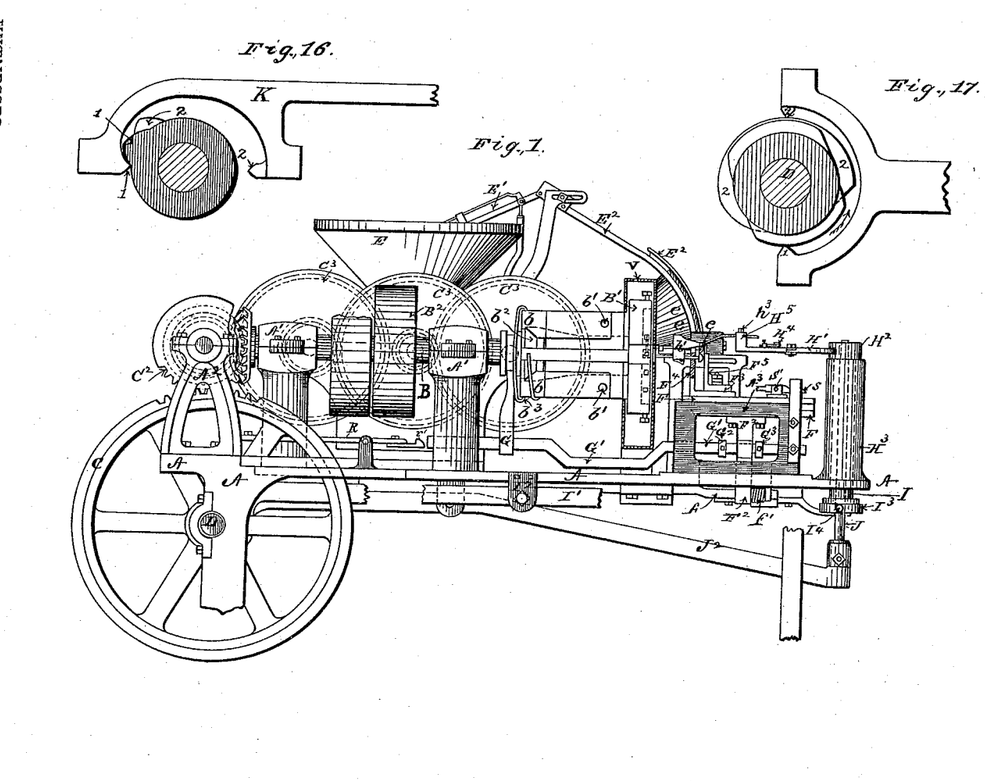
Figure 1 is a side elevation.
Figs. 15, 16, 17, and 18 are details, respectively, of the different cams and their co-operating yokes.
Figure 18:
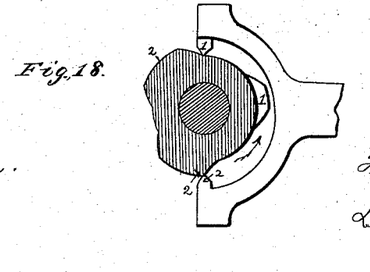

For oscillating sleeve I in swinging the grippers laterally more complex mechanism is required, to wit: Sleeve I has a lateral arm i, slotted lengthwise at i', and in this slot is nicely fitted a sliding box i², that may move along the slot in the direction toward and from the sleeve. A sliding bar K, that reciprocates endwise, has an overlapping member or extension K', the securing-bolts passing through elongated holes in one member, by means of which the length of the bar may be adjusted. The forward end or head of the bar extends laterally, (see Fig. 4,) and is provided with slot K². In this slot is adjustably secured the vertical wrist or stud K³, the same extending with an easy fit through the bore of box i², the length of the stud being such as will accommodate the vertical movement of sleeve I. By reciprocating bar K sleeve I is oscillated in moving the grippers laterally. The throw of the grippers laterally is regulated by adjusting stud K³ along slot K² in the direction approximately toward and from the line of sleeve I, so as to engage arm i, through the medium of box i², at a longer or shorter leverage, the box of course moving along slot i' with the adjustment of the stud. The lateral throw of the grippers having thus been adjusted to correspond exactly with the distance from center to center of the bolt to be picked up and the bolt-holder, it only remains to adjust the length of bar K, so as to bring the termini of such throw of the grippers directly over, respectively, the bolt and the bolt-holder. The different cams for operating, respectively, slide-bars f and K and for operating tilting levers I' and J² are all mounted on shaft D aforesaid, the two cams for operating said slide-bars being located side by side near the center of the shaft. The cam mechanism for reciprocating bar K is shown in Fig. 16, and that for tilting lever J² is shown in Fig. 17, and that for tilting lever I' is shown in Fig. 18. These cams are of ordinary construction, and will therefore hard require a detailed description thereof. I w add, however, that different cams are p vided on the same cam-disk for the rever movements required, the different cams series of cams, as the case may be, of cour operating in different planes. The can marked 1 engage contact-point 1, while can marked 2 for the reverse movement enga contact-points 2; also, the contact-points f the different cams are preferably adjustab on the yoke to take up the wear, (see Fig. 3 the different yokes for convenience being le tered the same as the different levers or ba with which the yokes are respectively co nected or are integral.

The cam mechanism (shown in Fig. 15) f reciprocating bar f requires a more extende description in order to clearly explain som movements of the machine.

Yoke M, that is attached to or is integr with bar f, has contact-points m and m' f engaging, respectively, cams n and n', the tw cams being integral with cam-disks N, but o erating in different planes. Contact-point is located low down, as shown, relative to th center of the cam-disk, whereby is utilize the forward sweep of the cam in moving th carriage forward quickly and for some di tance. With such construction the cam o course presses on the contact-point, but suc pressure is resisted by the boxes in which ba f slides. The carriage for a moment is hel stationary at its forward terminus during th time required in placing the bolt in the holde by means of the concentric portion of the cam and the heel of this cam is quite abrupt, a shown, so that the carriage may be reverse quickly after the disengagement of the can and contact-point. The action of cam n' i moving the carriage forward is of course i opposition to the action of spring f² aforesaid As cam n is disengaged from contact-point m cam n' engages contact-point m' and reverse the carriage. The action of this latter cam only reverses the carriage part way of its rearward throw, but far enough to bring the point of the bolt in contact with the dies. Bolts that are supposed to be of a given length still vary somewhat in length; hence the necessity of the cushioning-spring f'', whereby a longer bolt only compresses the spring without doing any harm, and I consider it better practice to adjust the bolt-holder so that spring f' will be more or less compressed with each bolt, such pressure of the spring causing the dies instantly to bite the bolts. Directly after the action of cam m' the cam-shaft D is stopped and remains at rest during the cutting of the bolt; but spring f² continues to act in moving the carriage rearward in unison with the thread-cutting, and thus relieves the threads being cut of the labor of moving the carriage, and hence the threads are much less liable to injury than would otherwise be the case.

Figure 7:
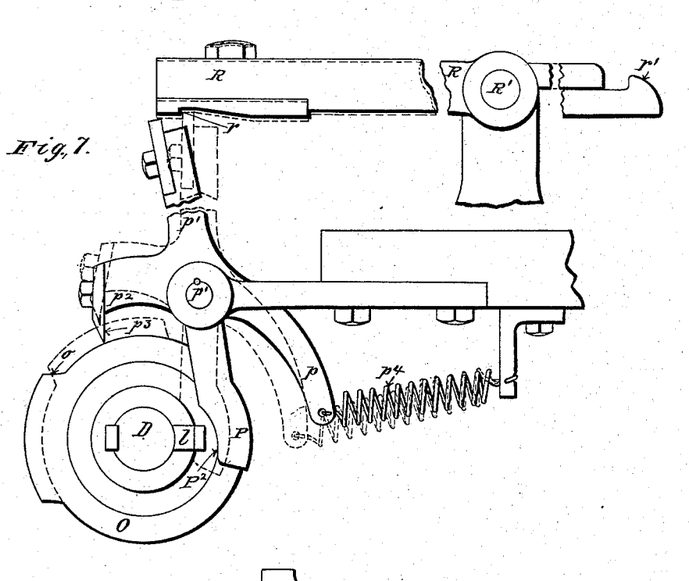
Fig. 7 is a side elevation of clutch mechanism.
Figure 8:
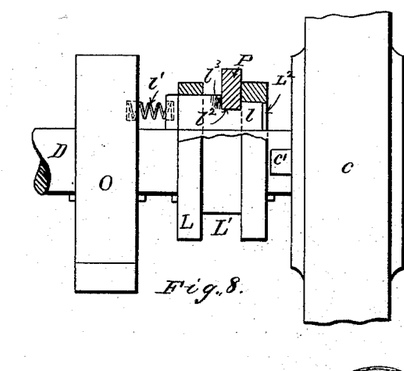
Fig. 8 is a plan, partly in section, of the clutch.
Figure 9:
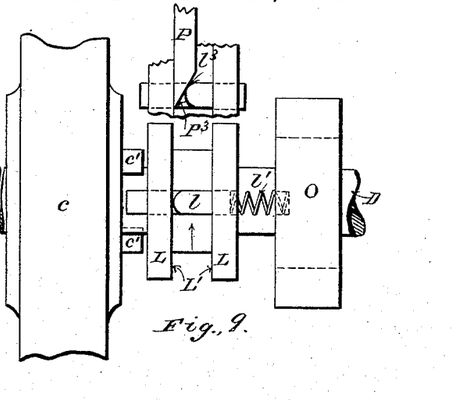
Fig. 9 is a front or inside elevation of the clutch.

The clutch mechanism for operating shaft D is as follows: The hub of wheel c, on the inner face thereof, is provided with a series of pins $c'$, set in concentric order relative to the axis of the wheel, these pins projecting toward the adjacent disk L, the latter being rigidly mounted on shaft D. Disk L has a circumferential flat-bottom groove $L'$, and the disk has also a transverse recess $L^2$, this recess cutting through the bottom wall of the groove. In this recess operates the spring-actuated dog $l$, the spring $l'$ thereof acting in the direction to thrust the dog toward wheel $c$, and thereby cause the dog to engage one of pins $c'$, whereby shaft D is caused to revolve with wheel $c$. The dog is provided with an external notch $l^2$, the bottom of which notch is flush with the bottom of groove $L'$. Of the two shoulders of the dog constituting the side walls of the notch the larger shoulder farthest from wheel $c$ is rounded, as shown at $l^3$, this corner moving foremost in the rotation of the shaft. For reversing the dog against the action of the spring, and thereby disengaging the dog from pins $c'$, a tilting finger P is provided, this finger being rigidly mounted on rock-shaft $P'$. This finger has a curved section $P^2$, adapted to fit the bottom of groove $L'$. (See Fig. 7.) The free end of the finger is wedge-shaped, as shown at $P^3$, Fig. 9. On shaft $P'$ is rigidly mounted a triple-armed shifting-lever having integral arms $p$, $p'$, and $p^2$. Arm $p$ is connected with spring $p^4$, this spring acting in the direction to swing finger P away from disk L. Arm $p'$ engages a notch in tilting latch R, by which engagement the shifting-lever is held against the action of spring $p^4$, and in position bearing finger P against the bottom of groove $L'$. Arm $p^2$ has a contact-point $p^3$ for engaging cam $o$ of disk O, by which engagement the shifting-lever is reversed against the action of spring $p^4$, thereby causing arm $p'$ to engage and lock with catch R. Disk O is rigidly mounted on shaft D in convenient proximity to disk L, disk O forming an abutment for the one end of spring $l'$ aforesaid. The tilting catch R is pivoted at $R'$, and, in addition to its notch $r$ for locking the shifting-lever, has on the other end thereof an incline $r'$. This incline is engaged by the rear end of rod $G'$ at the extreme rearward movement of the latter, by which engagement catch R is tilted, thereby releasing the triple-armed shifting-lever aforesaid, and causing finger P to move away from disk L, whereupon dog $l$ is thrust outward, engaging one of pins $c'$, thus causing shaft D to make a revolution. Before such revolution is completed cam $o$ will have engaged and passed contact-point $p^3$, and by such engagement will have reversed the shifting-lever, causing the latter to have been locked by catch R, and at the same time depressing finger P to its position in groove $L'$. In such position of parts, when the dog comes opposite the point of the finger, the latter, by engaging the rounded shoulder $l^3$, draws back the dog, and as the dog is disengaged from the opposing pin $c'$ finger P wedges into the notch of the dog and stops the shaft, such stoppage always occurring at the same point of revolution. On starting shaft D, first the carriage is moved forward, then the grippers do their work, and next the carriage is moved rearward until the bolt engages the die, at which time shaft D is stopped and remains idle while the bolt is being threaded. In this connection I will revert to the movement aforesaid of rod $G'$. The momentum of this rod, caused by backing out sleeve $b^2$, is sufficient to operate catch R, and hence no extra travel of the carriage is necessary, for such purpose, and the catch is released just at the right moment. I will call attention to the fact that the carriage having been moved rearward by the action of cam $n'$, as required to enter the bolt in the die, the engagement of the bolt with the die is all that prevents the carriage from being carried instantly rearward the full stroke thereof by the action of spring $f^2$, and although this spring might not have tension enough to start the carriage rearward it has sufficient force to continue such rearward movement, and if for any reason the grippers fail to place a bolt in the bolt-holder the carriage does instantly move rearward its full throw, thereby operating the clutch and causing shaft E to make another revolution, and so on until another bolt is in position, these movements being made with great rapidity. Sometimes the bolts clog in ways $E^2$, or for other reasons the bolts are not forthcoming, and on such occasions the antics of the grippers are amusing, and to a casual observer are suggestive of intelligence on the part of the machine and of a frantic endeavor on the part of the grippers to do their duty in supplying bolts. Meanwhile the resultant clatter might suggest a clamorous protest in machine dialect, and is, in fact, a call well understood by the operator. There remains to be described only the simple device for discharging the bolts from the machine. For this purpose a tilting lever S is fulcrumed to standard $S'$, the latter being attached to the carriage. The lever consists of two overlapping sections bolted together, rendering the bar adjustable in length for longer or shorter bolts. The rear end of the lever extends laterally under the bolt that is being cut, crossing the line of the bolt at about the center of gravity of the latter. The forward end of the lever is provided with incline $s$, and next rearward of the incline is notch $s'$.

Figures 4, 13, 14:
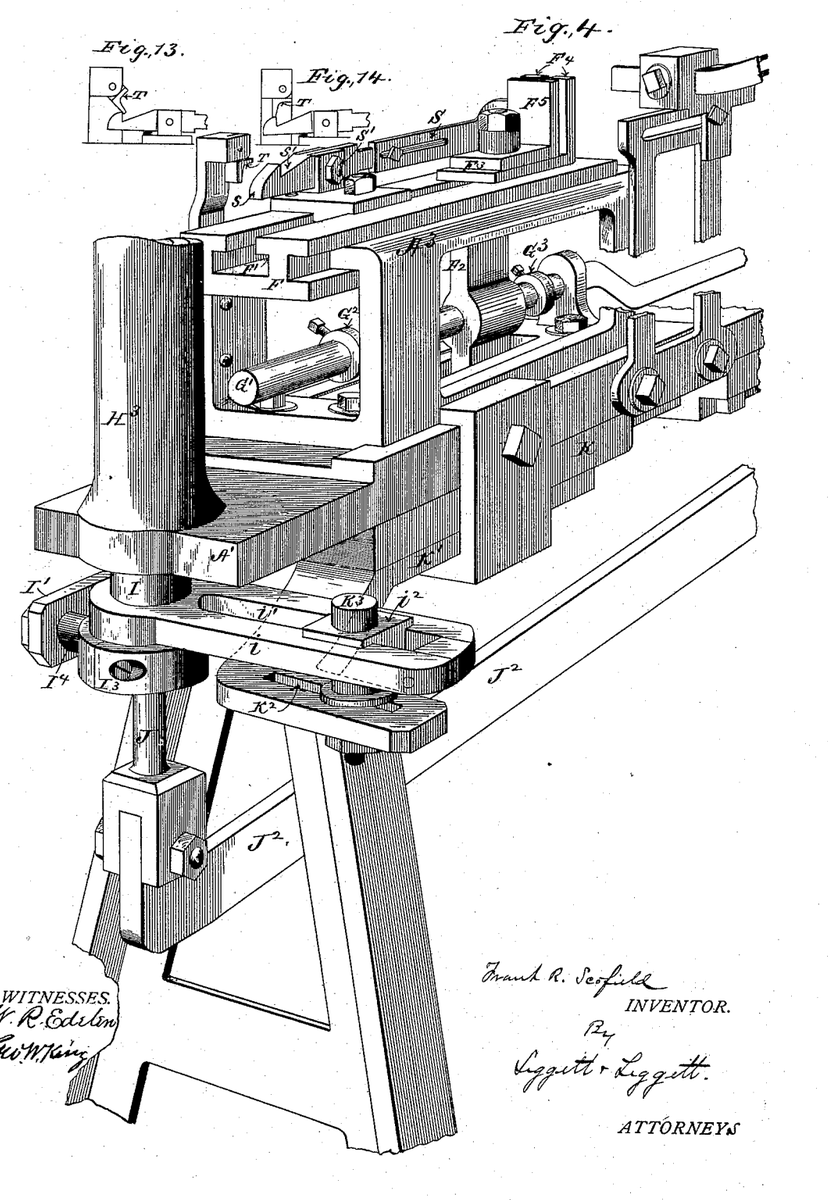
Fig. 4 is an enlarged front end perspective.
Figs. 13 and 14 are details showing different working positions of the tilting and tripping devices for discharging bolts from the machine.

T is a depending tilting plate set in the line of lever S. The pivotal connection of this plate is such that it cannot swing forward of a perpendicular line, but may tilt rearward. As the carriage nears its forward terminus incline $s$ engages plate T, thereby quickly tilting lever S, causing the rear end of the lever to strike the bottom of the bolt with such force as to throw the bolt against the inclined plate U, by which engagement the bolt is deflected, so that it falls outside of the machine. Instantly after the tilting lever S returns by gravity to its normal position, plate T meantime entering notch s'. As the carriage moves rearward again plate T tilts rearward, as shown in Fig. 14, thus releasing lever S without tilting the latter. Plate U and trough U', are both attached to the stationary hood V, that incloses the die-head, the function of trough V being to direct oil onto the bolt. With bolt-cutting machines as heretofore used, although a cheap operator was employed for feeding each machine, the wages of such operators constituted the greater part of the cost of bolt-cutting, the other expenses of running the machines being comparatively trifling; but an operator remained idle while a machine was being adjusted or repaired—a matter of frequent occurrence. I have in the same room with a number of the old machines two of my improved machines, hereinbefore described, in successful operation. The automatic mechanism aforesaid feeds much quicker than can be done by hand, and consequently the new machines turn out considerably more work per hour than the old machines. It is estimated that one operator can attend eight of the new machines, and consequently when one machine is idle, the operator being employed with the other seven operative machines, only a trifling loss is sustained by the employer. From these comparisons it will be seen that my invention is of great commercial value in the art.

As the machine is likely to be readjusted from time to time for bolts of different sizes and lengths, the gripper-jaws will require adjusting and possibly changing for others of different size. The gripper-jaws are therefore adjustably and detachably secured to the respective gripper-arms, as shown more clearly in Fig. 1, the shanks $h^2$ of the jaws entering holes in the gripper-arm heads $H^5$, with set-screws $h^3$ for holding the adjustment, whereby the jaws may be removed and replaced by others or may be adjusted lengthwise the gripper-arms, so as to grasp the bolt approximately at the center of gravity of the bolt. The different members of the machine and feed mechanism may be modified almost indefinitely without departing from the purpose and spirit of my invention. For instance, ways $E^2$ need not deliver the bolts at the one side of the bolt-holder, and if for any reason the bolts were delivered, for instance, above the bolt-holder, the grippers and co-operating mechanism would have to be modified accordingly. Again, the grippers, having been opened for discharging the bolts, may remain open until they are closed in picking up the next bolt, and a cam for operating spindle J under such conditions is shown in Fig. 18, while the cam for opening the grippers at each termini of the lateral throw, as hereinbefore described, may be substantially a duplicate of the cam shown in Fig. 17. Again, the shifting-lever shown and described, having triple arms, might be varied indefinitely, according to circumstances, and still perform the same functions. It is believed, however, that from the specification and drawings a person skilled in the art will have no difficulty in understanding the invention and making such changes as, according to circumstances, may be required.

My improved feed mechanism aforesaid may be applied to various bolt-cutting machines already in use, and hence the necessity of various modifications in applying the same.

What I claim is—

1. In a bolt-threading machine, the combination, with a reciprocating carriage, of a bolt-holder carried thereby, feeding-grippers, and mechanism to operate the grippers to convey bolts from a given location and deliver the same to the bolt-holder, substantially as set forth.

2. In a bolt-threading machine, the combination, with suitable frame-work, of a bolt-holder, feeding-grippers, mechanism for moving the grippers to and from the holder and reciprocating said grippers, a spring for closing the grippers, and a reciprocating spindle having a conical section or incline for engaging and opening the grippers, substantially as set forth.

3. In a bolt-threading machine, the combination, with vertical supporting-sleeve and feeding-grippers connected therewith, of a lever pivoted to the lower end of the sleeve for reciprocating same vertically for raising and lowering the grippers, an arm connecting the sleeve, and mechanism connected with the arm for oscillating the sleeve, substantially as set forth.

4. In a bolt-threading machine, the combination, with grippers, a sleeve, and means for oscillating and reciprocating said sleeve, of a reciprocating spindle operating in the bore of said sleeve, said spindle having a conical section or incline for engaging and thereby opening the grippers, and a spring for closing the grippers, substantially as set forth.

5. In a bolt-threading machine, the combination, with grippers and an oscillating and reciprocating sleeve, of a collar journaled on said sleeve, and a tilting lever connected with said collar, substantially as set forth.

6. In a bolt-threading machine, the combination, with grippers and an oscillating and reciprocating sleeve, of a lateral arm on said sleeve, a box mounted on and adapted to slide lengthwise of said arm, a stud in said box and adjustable to and from the sleeve, and a sliding bar attached to said stud, substantially as set forth.

7. In a bolt-threading machine, the combination, with grippers, a supporting-sleeve, and mechanism for oscillating and reciprocating said sleeve, of a lateral arm on said sleeve, a sliding bar having a stud connected with the lateral arm, and means for adjusting the stud toward and from the axis of the sleeve, substantially as set forth.

8. In a bolt-threading machine, the combination, with grippers and supporting-sleeve, of lateral arms projecting from the latter, a sliding bar having a stud attached, said stud being operatively connected with the lateral arm of the sleeve, means for adjusting the stud toward and from the sleeve for gaging the throw of the grippers, and means for adjusting the sliding bar in length to locate the termini of such lateral throw of the grippers, substantially as set forth.

9. The combination, in a bolt-threading machine, of feeding-grippers, jaws depending therefrom, one of said jaws being wedge-shaped for entering between the bolts and the other jaw having a concaved face adapted to fit the bolt, and mechanism for operating said grippers, substantially as set forth.

10. In a bolt-threading machine, the combination, with screw-cutting devices and operating mechanism, of feeding-grippers, substantially as described, and depending jaws adjustably and detachably connected to said grippers, substantially as set forth.

11. The combination, with carriage-bearing bolt-holder and threading-dies, of actuating-bar for reciprocating the carriage, said bar having a rigid connection with the carriage in moving the latter from the threading-dies and having a yielding connection with the carriage in reversing the latter, substantially as set forth.

12. The combination, with a reciprocating carriage and a bolt-holder, of a tilting lever having an incline and a notch, and a tilting plate for engaging said incline for tilting the lever and engaging the notch when the lever is reversed, said plate being pivoted to swing only with the rear movement of the carriage, whereby the lever, without tilting, is released from the plate, substantially as set forth.

13. The combination, with reciprocating carriage and feeding-grippers, of cam-shaft bearing cams for imparting the necessary movements to the grippers and carriage, and automatic clutch for intermittently rotating such shaft one revolution at a time, substantially as set forth.

14. The combination, with a reciprocating carriage and feeding-grippers, of cam-shaft bearing cams and imparting the necessary movements to grippers and carriage, and automatic clutch for intermittently rotating such shaft, whereby, with each movement of the shaft, the carriage and grippers are actuated in cutting and feeding a bolt and discharging the latter from the machine, substantially as set forth.

15. In a bolt-threading machine, the combination, with suitable frame-work and a suitable carriage, of cam-shaft D, bearing the two members of the clutch, spring-actuated dog for connecting the two members of the clutch, tilting finger for reversing the dog and stopping the shaft, spring-actuated shifting-lever for operating such fingers, and cam for reversing the lever-catch for holding such lever in the reversed position, such catch being released from the shifting-lever by engaging with the carriage of the bolt-machine or by engaging an attachment of the latter, substantially as set forth.

16. In a bolt-threading machine, the combination, with threading and feeding devices and a cam-shaft for controlling the operation of the feeding devices, of a tilting lever and a pivoted finger for engaging and holding said cam-shaft stationary during the threading of the bolt, substantially as set forth.

In testimony whereof I sign this specification, in the presence of two witnesses, this 24th day of December, 1888.

FRANK R. SCOFIELD.

Witnesses:
 CHAS. H. DORER,
 ALBERT E. LYNCH.